(12) United States Patent
Jeong et al.

(10) Patent No.: US 10,104,647 B2
(45) Date of Patent: Oct. 16, 2018

(54) METHOD AND APPARATUS FOR TRANSMITTING AND RECEIVING CONTROL INFORMATION IN WIRELESS COMMUNICATION SYSTEM

(71) Applicant: Samsung Electronics Co., Ltd, Gyeonggi-do (KR)

(72) Inventors: Cheol Jeong, Seoul (KR); Jeong-Ho Park, Seoul (KR); Ji-Yun Seol, Gyeonggi-do (KR); Hyun-Kyu Yu, Gyeonggi-do (KR); Jae-Weon Cho, Gyeonggi-do (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 363 days.

(21) Appl. No.: 13/946,825

(22) Filed: Jul. 19, 2013

(65) Prior Publication Data
US 2014/0023006 A1  Jan. 23, 2014

(30) Foreign Application Priority Data

Jul. 20, 2012 (KR) .................. 10-2012-0079115

(51) Int. Cl.
H04W 72/04 (2009.01)
(52) U.S. Cl.
CPC ..... *H04W 72/042* (2013.01); *H04W 72/0446* (2013.01)
(58) Field of Classification Search
None
See application file for complete search history.

(56) References Cited

U.S. PATENT DOCUMENTS

| | | | |
|---|---|---|---|
| 2010/0232373 A1* | 9/2010 | Nory et al. | 370/329 |
| 2010/0254329 A1* | 10/2010 | Pan et al. | 370/329 |
| 2011/0021191 A1 | 1/2011 | Damnjanovic et al. | |
| 2011/0032900 A1 | 2/2011 | Maheshwari et al. | |
| 2011/0122825 A1* | 5/2011 | Lee et al. | 370/328 |
| 2011/0274066 A1 | 11/2011 | Tee et al. | |
| 2011/0274099 A1 | 11/2011 | Kwon et al. | |

(Continued)

FOREIGN PATENT DOCUMENTS

| | | |
|---|---|---|
| WO | WO 2009/130280 A2 | 10/2009 |
| WO | WO 2011/038405 A2 | 3/2011 |

(Continued)

OTHER PUBLICATIONS

International Search Report dated Oct. 22, 2013 in connection with International Patent Application No. PCT/KR2013/006445.

(Continued)

*Primary Examiner* — Chirag Shah
*Assistant Examiner* — Srinivasa Reddivalam

(57) ABSTRACT

A method transmits control information in a wireless communication system. The method includes transmitting a first carrier signal including first control information; and transmitting a second carrier signal including at least one of second control information and data. The first control information is information indicating whether the second control information is carried on the second carrier signal, and the second control information is scheduling information for the data, and is generated to correspond to the first control information.

8 Claims, 11 Drawing Sheets

(56) References Cited

U.S. PATENT DOCUMENTS

| | | | | |
|---|---|---|---|---|
| 2012/0122392 A1* | 5/2012 | Morioka | .............. | H04B 7/0695 |
| | | | | 455/25 |
| 2013/0039284 A1* | 2/2013 | Marinier | ................ | H04L 5/001 |
| | | | | 370/329 |
| 2013/0083769 A1* | 4/2013 | Qu | ........................ | H04L 5/0016 |
| | | | | 370/330 |
| 2013/0136006 A1 | 5/2013 | Kim et al. | | |

FOREIGN PATENT DOCUMENTS

| | | |
|---|---|---|
| WO | WO 2011/089056 A1 | 7/2011 |
| WO | WO 2011/145823 A2 | 11/2011 |

OTHER PUBLICATIONS

Written Opinion of the International Searching Authority dated Oct. 22, 2013 in connection with International Patent Application No. PCT/KR2013/006445.

* cited by examiner

PDCCH INFORMATION OF COMPONENT CARRIER 1 ~ 701

| Carrier indicator | Additional PDCCH flag | Resource allocation header | Resource block assignment | TPC command | Downlink assignment index | HARQ process number | Transport block to codeword swap flag | Information for transport block 1 | Information for transport block 2 |
|---|---|---|---|---|---|---|---|---|---|
| 711 | 713 | | | 719 | 721 | 723 | 725 | 727 | 729 |

FIG.7

PDCCH INFORMATION OF COMPONENT CARRIER 1 ~ 801

| Carrier indicator | Additional PDCCH flag | PDCCH location indication | Resource allocation header | Resource block assignment |
|---|---|---|---|---|
| 811 | 813 | | | |

PDCCH INFORMATION OF COMPONENT CARRIER 2 ~ 803

| TPC command | Downlink assignment index | HARQ process number | Transport block to codeword swap flag | Information for transport block 1 | Information for transport block 2 | Additional information |
|---|---|---|---|---|---|---|
| 821 | 823 | 825 | 827 | 829 | 831 | |

FIG.8

PDCCH INFORMATION OF COMPONENT CARRIER 1 ~ 901

| Carrier indicator | PDCCH location indication |
|---|---|
| 911 | 913 |

PDCCH INFORMATION OF COMPONENT CARRIER 2 ~ 903

| Resource allocation header | Resource block assignment | TPC command | Downlink assignment index | HARQ process number | Transport block to codeword swap flag | Information for transport block 1 | Information for transport block 2 | Additional information |
|---|---|---|---|---|---|---|---|---|
| 915 | 917 | 919 | 921 | 923 | 925 | 927 | 929 | 931 |

FIG.9

METHOD AND APPARATUS FOR TRANSMITTING AND RECEIVING CONTROL INFORMATION IN WIRELESS COMMUNICATION SYSTEM

CROSS-REFERENCE TO RELATED APPLICATION(S) AND CLAIM OF PRIORITY

The present application is related to and claims the benefit under 35 U.S.C. § 119(a) of a Korean Patent Application filed in the Korean Intellectual Property Office on Jul. 20, 2012 and assigned Serial No. 10-2012-0079115, the entire disclosure of which is incorporated herein by reference.

TECHNICAL FIELD

The present disclosure relates to a method and apparatus for transmitting and receiving control information in a wireless communication system.

BACKGROUND

A Long-Term Evolution Advanced (LTE-A) system has evolved from the Long-Term Evolution (LTE) system to meet the requirements of International Mobile Telecommunication-Advanced (IMT-A). While the LTE system may support a bandwidth of a maximum of 20 MHz, the LTE-A system may support broadband services based on a bandwidth of a maximum of 100 MHz, using the Carrier Aggregation (CA) technology.

Uplink/Downlink (UL/DL) resource allocation information, transmission format information, UL power control commands and the like may be contained in Downlink Control Information (DCI), and transmitted from a transmitter (for example, base station) to a receiver (for example, terminal) over a Physical Downlink Control Channel (PDCCH) in a control region. A carrier signal on which data is carried may be different from a carrier signal on which DCI is carried, and this is referred to as 'cross-carrier scheduling'.

For high-speed data transmission, carrier signals of a wide bandwidth in a high-frequency region may be aggregated. Generally, a receiver consumes more power for a carrier signal in the high-frequency region than a carrier signal in a low-frequency region, in order to check the carrier signal in the high-frequency region. Therefore, in terms of power consumption of the receiver, it is efficient that scheduling information for data, which is carried on the carrier signal in the high-frequency region, is delivered over a PDCCH of another carrier signal in the low-frequency region, using cross-carrier scheduling. The term 'high-frequency region' as used herein may refer to an ultrahigh frequency band of, for example, 5 Giga-hertz (GHz) to 60 GHz.

In order to efficiently support carrier signals of a broadband in the high-frequency region, a new transmission mode needs to be added, or more precise UL power control needs to be used. However, due to the limited number of bits of the DCI format defined in the LTE-A standard, in order to add new information fields in DCI or increase the number of bits of the existing fields, other fields need to be deleted or the number of bits used in the other fields needs to be reduced. For example, if the number of bits allocated for data transmission is reduced, granularity of resource allocation for the data to be carried on carrier signals of a broadband in the high-frequency region may be reduced undesirably. Therefore, there is a need for a method of efficiently transmitting and receiving a large amount of control information using cross-carrier scheduling in a wireless communication system.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies of the prior art, it is a primary object to provide a method and apparatus for transmitting and receiving control information using cross-carrier scheduling in a wireless communication system.

Another aspect of exemplary embodiments of the present disclosure is to provide a method and apparatus for transmitting and receiving a large amount of control information when scheduling data carried on a broadband carrier signal in a high-frequency region using cross-carrier scheduling in a wireless communication system supporting Carrier Aggregation (CA).

Further another aspect of exemplary embodiments of the present disclosure is to provide a method and apparatus for increasing granularity of resource allocation or delivering additional control information when scheduling data carried on a broadband carrier signal in a high-frequency region using cross-carrier scheduling in a wireless communication system supporting CA.

In accordance with an aspect of the present disclosure, there is provided a method for transmitting control information in a wireless communication system. The method includes transmitting a first carrier signal including first control information; and transmitting a second carrier signal including at least one of second control information and data. The first control information may be information indicating whether the second control information is carried on the second carrier signal, and the second control information may be scheduling information for the data, and generated to correspond to the first control information.

In accordance with another aspect of the present disclosure, there is provided a method for receiving control information in a wireless communication system. The method includes receiving a first carrier signal including first control information; and receiving a second carrier signal including at least one of second control information and data. The first control information may be information indicating whether the second control information is carried on the second carrier signal, and the second control information may be scheduling information for the data, and generated to correspond to the first control information.

In accordance with further another aspect of the present disclosure, there is provided a transmitter apparatus for transmitting control information in a wireless communication system. The transmitter apparatus includes a control unit for configuring a first carrier signal including first control information and a second carrier signal including at least one of second control information and data; and a transceiver unit for transmitting the first carrier signal and the second carrier signal. The first control information may be information indicating whether the second control information is carried on the second carrier signal, and the second control information may be scheduling information for the data, and generated to correspond to the first control information.

In accordance with yet another aspect of the present disclosure, there is provided a receiver apparatus for receiving control information in a wireless communication system. The receiver apparatus includes a transceiver unit for receiving a first carrier signal including first control information and a second carrier signal including at least one of second control information and data; and a control unit for checking the first carrier signal and the second carrier signal. The first control information may be information indicating whether the second control information is carried on the second carrier signal, and the second control information may be scheduling information for the data, and generated to correspond to the first control information.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 7 illustrates an example of fields included in PDCCH information of a first component carrier according to an exemplary embodiment of the present disclosure;

FIG. 8 illustrates an example of fields included in PDCCH information of a first component carrier and fields included in PDCCH information of a second component carrier according to an exemplary embodiment of the present disclosure;

FIG. 9 illustrates another example of fields included in PDCCH information of a first component carrier and fields included in PDCCH information of a second component carrier according to an exemplary embodiment of the present disclosure;

Throughout the drawings, like reference numerals will be understood to refer to like parts, components, and structures.

DETAILED DESCRIPTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure provides a method and apparatus for transmitting and receiving a large amount of control information using cross-carrier scheduling in a wireless communication system supporting Carrier Aggregation (CA). The term 'control information' as used herein may refer to DL/UL control information.

Prior to a detailed description of the present disclosure, a description will be made of a radio frame structure for transmitting and receiving control information over a PDCCH between a transmitter and a receiver in an LTE-A system. In the following description, control information transmitted over a PDCCH will be defined as 'PDCCH information' and data transmitted over a Physical Downlink Shared Channel (PDSCH) will be defined as 'PDSCH information'.

Figure 1:
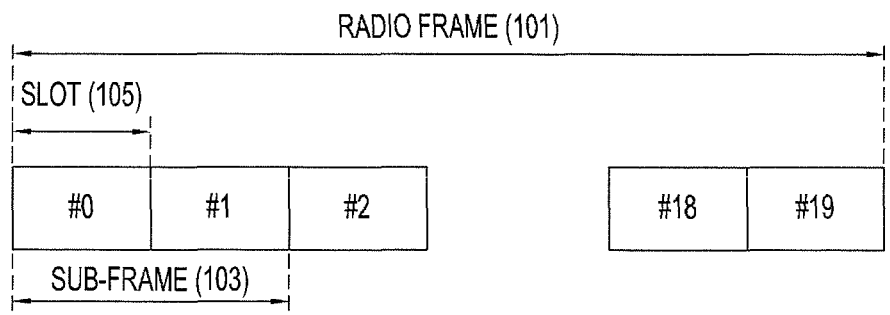
FIG. 1 illustrates a Frequency Division Duplex (FDD) DL radio frame structure in an LTE-A system.

FIG. 1 illustrates a Frequency Division Duplex (FDD) DL radio frame structure in an LTE-A system. Although an FDD DL radio frame structure is considered in FIG. 1, the present disclosure may be applied even to a Time Division Duplex (TDD) DL radio frame structure.

Referring to FIG. 1, one radio frame 101 is comprised of ten sub-frames 103, and one sub-frame 103 is comprised of two slots 105 having the same length. The one sub-frame 103 has a length of 1 ms, and is a scheduling unit for data transmission.

In the LTE-A system, a sub-frame structure having a type different from that of the existing sub-frame structure, which has been developed in the type of up to Release 10, will be defined in the future Release. For convenience of description, a sub-frame in the type of up to Release 10 will be referred to as an 'existing type' of sub-frame, while a sub-frame in a new structure, which may be added in the future, will be referred to as a 'new type' of sub-frame.

Figure 2:
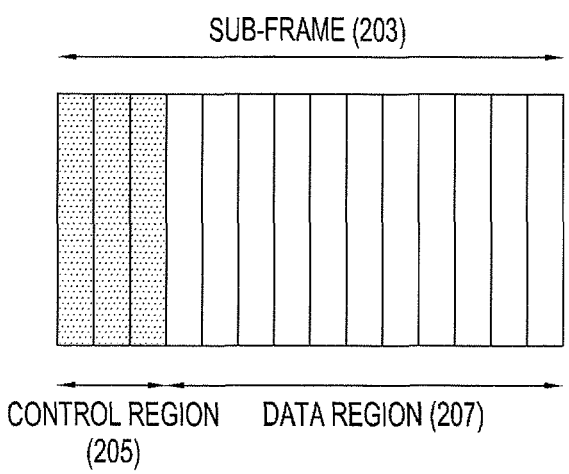
FIG. 2 illustrates the existing type of sub-frame structure in an LTE-A system.

FIG. 2 illustrates the existing type of sub-frame structure in an LTE-A system.

When a Cyclic Prefix (CP) of a normal length is used, one sub-frame 203 has a total of 14 Orthogonal Frequency Division Multiplexing (OFDM) symbols. PDCCH information is allocated to a maximum of first three OFDM symbols of the first slot, and this is called a control region 205. PDSCH information is allocated to the rest of the sub-frame 203, and this is called a data region 207. One or more PDCCH information may be transmitted in the control region 205.

A unique identifier (for example, Radio Network Temporary Identifier (RNTI)) of a receiver is included in a Cyclic Redundancy Check (CRC) required to generate PDCCH information. The receiver needs to monitor the PDCCH information in every sub-frame to check PDSCH information. A length of a PDCCH processing period, for which the receiver (for example, terminal) receives and decodes PDCCH, may be affected by the processing performance of the terminal. At the end of the PDCCH processing period, the terminal may determine whether a PDSCH for data reception is allocated thereto in the sub-frame. If the terminal is allocated no PDSCH, the terminal may turn OFF one or multiple components of the terminal during the remaining period of the sub-frame, thereby reducing the power consumption.

If broadband carrier signals are used in the high-frequency region, the length of OFDM symbols is shortened. In addition, since the high-frequency region is worse than the low-frequency region in terms of the channel environment, beamforming technology may be required. Accordingly, a new type of sub-frame structure may be required in the high-frequency region.

Figure 3:
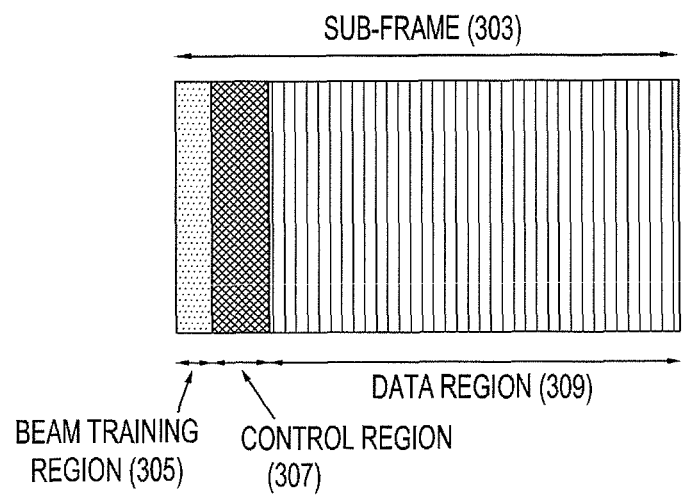
FIG. 3 illustrates an example of a new type of sub-frame structure in an LTE-A system.

FIG. 3 illustrates an example of a new type of sub-frame structure in an LTE-A system. In this example, a beam training region, a control region and a data region are included in the new type of sub-frame structure, for broadband carrier signals in the high-frequency region.

Referring to FIG. 3, one sub-frame 303 includes a beam training region 305, a control region 307 and a data region 309. In the beam training region 305, a receiver searches for the optimal pair of a Transmit (Tx) beam of a transmitter and a Receive (Rx) beam of the receiver. Using the searched beams, the receiver receives PDCCH information in the control region 307, or receives PDSCH information in the data region 309.

Figure 4:
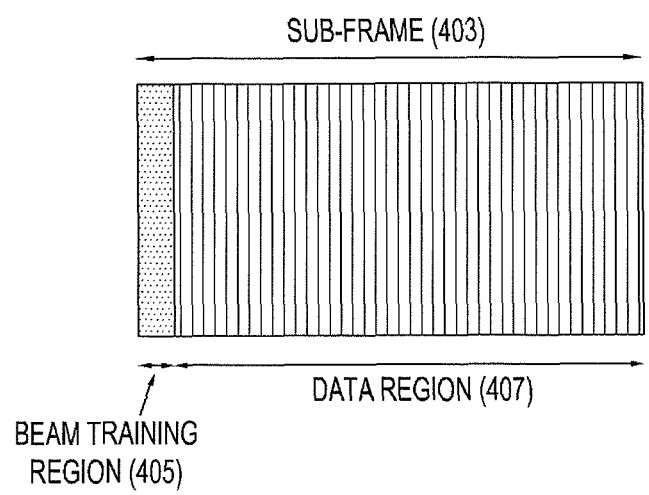
FIG. 4 illustrates another example of a new type of sub-frame structure in an LTE-A system.

FIG. 4 illustrates another example of a new type of sub-frame structure in an LTE-A system. In this example, a beam training region and a data region are included in the new type of sub-frame structure, for broadband carrier signals in the high-frequency region.

Referring to FIG. 4, one sub-frame 403 includes a beam training region 405 and a data region 407. As described in connection with reference to FIG. 3, a receiver searches for the optimal pair of a Tx beam of a transmitter and an Rx beam of the receiver in the beam training region 405, and receives PDSCH information in the data region 407 using the searched beams. Both of the PDCCH information and the PDSCH information may be allocated to the data region 407.

In the present disclosure, the new type of sub-frame structure is not applied only to the case where broadband carrier signals are used in the high-frequency region. In other words, a sub-frame structure having a type different from that described in the present disclosure may be used for other frequency bands and/or other sizes of frequency bands.

Multiple UL/DL carrier signals may not be aggregated for one receiver. Each of the aggregated carrier signals will be referred to as a component carrier signal. As described above, PDSCH information carried on one carrier signal may be allocated by PDCCH information carried on another carrier signal, and this is referred to as 'cross-carrier scheduling'. For convenience of description, a component carrier signal on which PDCCH information is carried during a cross-carrier scheduling operation will be referred to as a 'first component carrier', and a component carrier signal on which PDSCH information is carried based on the PDCCH information will be referred to as a 'second component carrier'. PDCCH information carried on a component carrier signal will be referred to as 'PDCCH information of a component carrier', and PDSCH information carried on a component carrier signal will be referred to as 'PDSCH information of a component carrier'.

Figure 5:
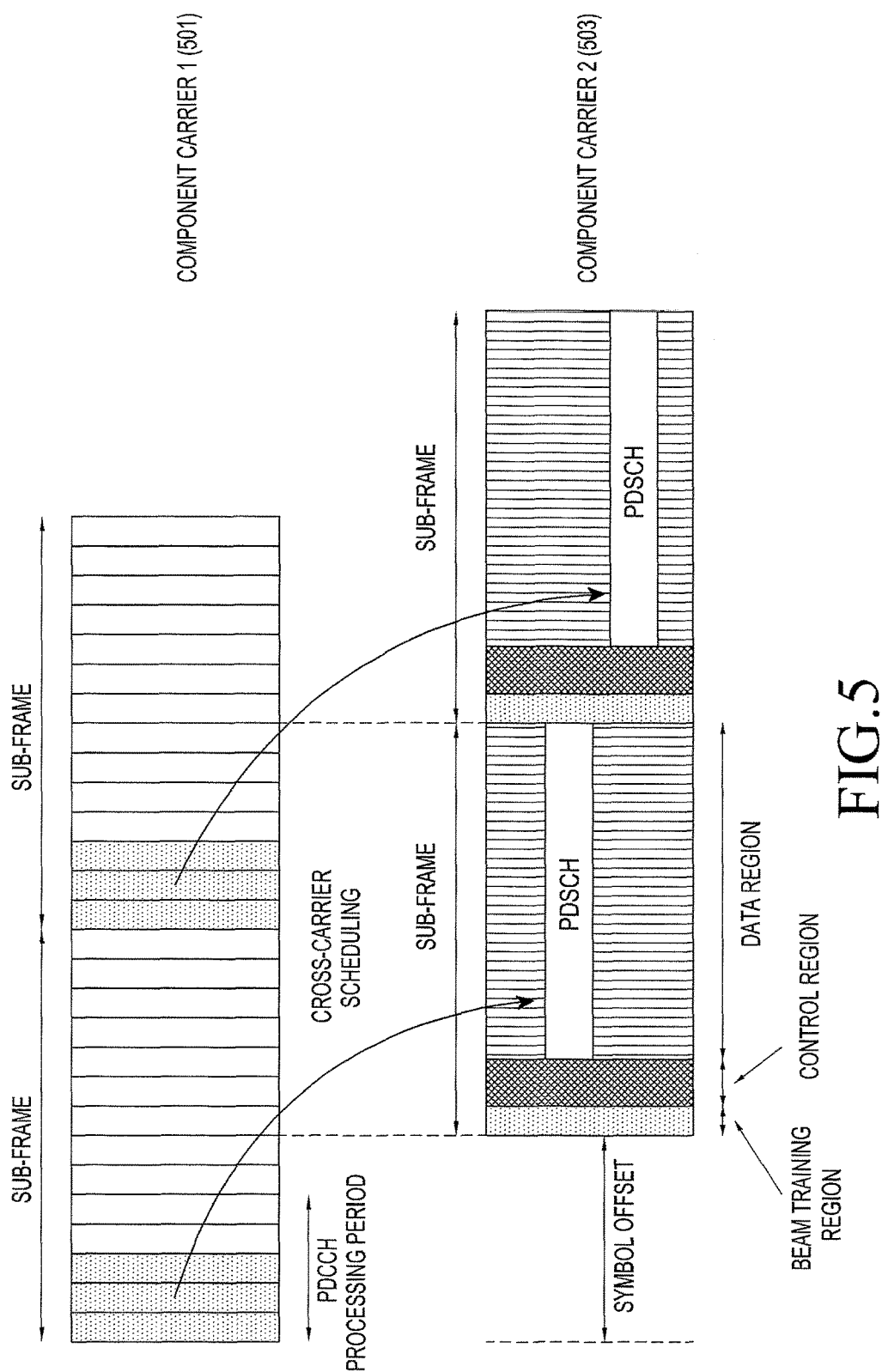
FIG. 5 illustrates an example of the general cross-carrier scheduling.

FIG. 5 illustrates an example of the general cross-carrier scheduling. In this example, two DL component carriers are aggregated for one receiver, and a second component carrier undergoes cross-carrier scheduling by a first component carrier.

Referring to FIG. 5, a transmitter transmits a signal of a first component carrier 501 including PDCCH information to a receiver. In response, the receiver receives the signal of the first component carrier 501, and checks PDCCH information of the received first component carrier 501 to acquire PDSCH information carried on a second component carrier 503.

A length of a PDCCH processing period, for which the receiver (for example, terminal) receives and checks the signal of the first component carrier 501, may be affected by the processing performance of the receiver. For example, it will be assumed in FIG. 5 that the time required to receive and check the signal of the first component carrier 501 corresponds to five OFDM symbols. The starting position of a sub-frame of the second component carrier 503 may be different from the starting position of a sub-frame of the first component carrier 501. In the exemplary case of FIG. 5, the starting position of the sub-frame of the second component carrier 503 is different by seven OFDM symbols from the starting position of the sub-frame of the first component carrier 501. The reason why the starting position of the sub-frame of the second component carrier 503 is set to go behind the time required to receive and check the signal of the first component carrier 501 (to be specific, by 2 (=7–5) OFDM symbols) is because a component for receiving the signal of the second component carrier 503 is turned ON only when the receiver is allocated data information in the second component carrier 503, thereby reducing the power consumption. For more details, see WO 2011/089056 A1, entitled "Micro-sleep techniques in LTE receivers".

PDCCH information formats that can be used for DL scheduling in the LTE-A system may include PDCCH information formats 1, 1A, 1B, 1C, 1D, 2, 2A, 2B, and 2C. PDCCH information format 1C may not be used for cross-carrier scheduling since there is no 'Carrier indicator' field in this format. In the LTE-A system, PDCCH information is designed to allocate resources for a maximum of 110 resource blocks. If resources of broadband carriers in a high-frequency region are allocated using this PDCCH information, the resource blocks will be very large in size. The large size of resource blocks may not be a problem, if low-speed data is transmitted in the existing type of component carrier and the high-speed data is transmitted in the new type of component carrier. In some cases, however, more information may need to be included in the PDCCH information in the new type of component carrier, compared to that in the existing type of component carrier. In this case, the number of bits for resource allocation may be insufficient. For example, a set of a larger number of precoding matrixes may be used for the new type of component carrier, and in this case, a larger number of bits used to indicate the precoding matrixes may be required. In addition, if a change in UL channel is significant and fast, a larger number of bits may be required for UL power control. In this case, in order to provide the same coverage, specific fields of DL control information may need to be deleted, or the number of bits of fields for resource allocation may need to be reduced. If the specific fields cannot be deleted, the number of bits of fields for resource allocation needs to be reduced, causing a decrease in the existing granularity of resource allocation.

To solve these and other problems, the present disclosure provides the following methods.

An exemplary embodiment of the present disclosure provides a scheme in which when allocating PDCCH information of a second component carrier as PDCCH information of a first component carrier using cross-carrier scheduling, a transmitter announces or provides PDSCH information by additionally transmitting PDCCH information on the second component carrier without including the PDCCH information of the second component carrier in the PDCCH information of the first component carrier. For example, the transmitter may transmit at least one of the fields of PDCCH information of the second component carrier, which can be included in the PDCCH information of the first component carrier as in FIG. 7, in the second component carrier as the transmitter's PDCCH information as illustrated in FIG. 8, instead of including the least one of the fields of PDCCH information in the first component carrier. The PDCCH information of the second component carrier includes, for example, a 'TPC command' field 719, a 'Downlink Assignment index (DAI)' field 721, an 'HARQ process number' field 723, a 'Transport block codeword swap flag' field 725, an 'information for transport block 1' field 727 and an 'information for transport block 2' field and 729.

A description will now be made of an apparatus and method for transmitting and receiving control information between a transmitter and a receiver in a wireless communication system according to an exemplary embodiment of the present disclosure.

The term 'transmitter' as used herein may refer to an entity for transmitting a PDCCH and/or a PDSCH, and may be, for example, a base station. The term 'base station' as used herein may refer to an entity for communicating with a terminal, and may be referred to as one of Base Station (BS), Node B (NB), evolved Node B (eNB), Access Point (AP) and the like.

The term 'receiver' as used herein may refer to an entity for receiving a PDCCH and/or a PDSCH, and may be, for example, a terminal. The term 'terminal' as used herein may refer to an entity for communicating with a base station, and may be referred to as one of User Equipment (UE), Mobile Station (MS), Mobile Equipment (ME), device, terminal and the like.

Figure 6:
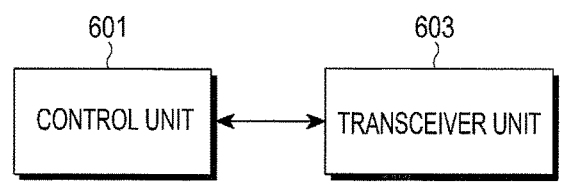
FIG. 6 illustrates a block diagram of a transmitter for transmitting control information in a wireless communication system according to an exemplary embodiment of the present disclosure.

FIG. 6 illustrates a block diagram of a transmitter for transmitting control information in a wireless communication system according to an exemplary embodiment of the present disclosure.

Referring to FIG. 6, the transmitter includes a control unit 601 and a transceiver unit 603. The transceiver unit 603 may be divided into a transmitting unit and a receiving unit.

The control unit 601 configures at least one of PDCCH information of a first component carrier and PDCCH information of a second component carrier. In other words, the control unit 601 configures the PDCCH information of the first component carrier, which indicates that the PDCCH information of the second component carrier has been carried on the second component carrier. Based on the configured PDCCH information of the first component carrier, the control unit 601 configures the PDCCH information of the second component carrier. For example, the control unit 601 may configure the PDCCH information of the first component carrier and the PDCCH information of the second component carrier in the following three different exemplary ways. The transceiver unit 603 transmits, to a receiver, a signal of the first component carrier including the configured PDCCH information of the first component carrier, and a signal of the second component carrier including the configured PDCCH information of the second component carrier and the PDSCH information.

Specifically, in a first exemplary way, when configuring the PDCCH information of the first component carrier as in FIGS. 7 and 8, the control unit 601 inserts a 'Carrier indicator' field 711 and a 1-bit 'Additional control info flag' field 713 into the PDCCH information of the first component carrier, to inform the receiver whether the PDCCH information of the second component carrier is carried on the second component carrier, or the PDSCH information is carried on the second component carrier. The 'Additional control info flag' field 713 may be referred to as, for example, an 'Additional PDCCH flag' field or a 'Decoding type' field.

In other words, FIG. 7 illustrates an example of fields included in PDCCH information of a first component carrier 701 according to an exemplary embodiment of the present disclosure. As illustrated in FIG. 7, in order to inform the receiver that only the PDSCH information of the second component carrier is carried on the second component carrier, when configuring the PDCCH information of the first component carrier 701, the control unit 601 may set the 'Carrier indicator' field 711 among the fields included in the PDCCH information of the first component carrier 701, to a value (for example, a binary value of '1') indicating the second component carrier, and may set the 'Additional control info flag' field 713 to '0'. In other words, the 'Additional control info flag' field 713, which is set to '0', may indicate that the PDCCH information of the second component carrier is not carried on the second component carrier and only the PDSCH information of the second component carrier is carried on the second component carrier. The PDCCH information (for example, at least one of the 'TPC command' field 719, the 'DAI' field 721, the 'HARQ process number' field 723, the 'Transport block codeword swap flag' field 725, the 'information for transport block 1' field 727 and the 'information for transport block 2' field and 729) of the second component carrier may be carried on the first component carrier 701.

FIG. 8 illustrates an example of fields included in PDCCH information of a first component carrier 801 and fields included in PDCCH information of a second component carrier 803 according to an exemplary embodiment of the present disclosure. As illustrated in FIG. 8, in order to inform the receiver that PDCCH information of the second component carrier 803 is carried on the second component carrier 803, when configuring the PDCCH information of the first component carrier 801, the control unit 601 may set a 'Carrier indicator' field 811 among the fields included in the PDCCH information of the first component carrier 801, to a value (for example, a binary value of '1') indicating the second component carrier 803, and may set an 'Additional control info flag' field 813 to '1'. In addition, the control unit 601 sets the fields for receiving PDSCH information, in the PDCCH information of the second component carrier 803. In other words, the 'Additional control info flag' field 813, which is set to '1', may indicate that not only the PDSCH information of the second component carrier 803 but also the PDCCH information (for example, at least one of a 'TPC command' field 821, a 'DAI' field 823, an 'HARQ process number' field 825, a 'Transport block codeword swap flag' field 827, an 'information for transport block 1' field 829 and an 'information for transport block 2' field and 831) of the second component carrier 803 are carried on the second component carrier 803.

In a second exemplary way, as illustrated in FIG. 9, for a specific transmission mode, the controller 601 configures PDCCH information of a first component carrier 901 and PDCCH information of a second component carrier 903 in a predetermined PDCCH format. The term 'specific transmission mode' as used herein may refer to a transmission mode used in a communication system to which the present disclosure is applied. In other words, as illustrated in FIG. 9, the control unit 601 may be configured such that when a receiver has received PDCCH information of the first component carrier 901, the receiver may unconditionally receive PDCCH information of the second component carrier 903.

FIG. 9 illustrates another example of fields included in PDCCH information of a first component carrier and fields included in PDCCH information of a second component carrier according to an exemplary embodiment of the present disclosure. As illustrated in FIG. 9, when configuring PDCCH information of the first component carrier, the control unit 601 may set a 'Carrier indicator' field 911 among the fields included in the PDCCH information of the first component carrier, to a value (for example, a binary value of '1') indicating the second component carrier, and may set information about a location where PDCCH information is allocated in the second component carrier, in a 'PDCCH location indication' field 913. When PDCCH information needs to be transmitted in the second component carrier 903, it is efficient to send most of the necessary information in the PDCCH information of the second component carrier 903 in terms of the utilization of the PDCCH resources of the first component carrier. Therefore, like in the second exemplary way, as for the PDCCH information of the first component carrier 901, which is used to indicate that the receiver should unnecessarily receive the PDCCH information of the second component carrier 903 on the second component carrier 903, the transmitter may determine the PDCCH information in a PDCCH format having a less number of bits as in the first component carrier 901 of FIG. 9. By doing so, it is possible to efficiently use resources in a control region of the first component carrier 901. In the second exemplary way, it can be understood that in FIG. 9, unlike in FIG. 8, a 'Resource allocation header' field 915 and a 'Resource block assignment' field 917 are also included in the PDCCH information of the second component carrier. Therefore, the receiver may acquire all the PDCCH information 915, 917, 919, 921, 923, 925, 927, 929 and 931 of the second component carrier from the PDCCH information not of the first component carrier, but of the second component carrier.

In a third exemplary way, the control unit 601 may be set such that if a receiver receives PDCCH information of a first component carrier for a specific time period, the receiver may receive PDCCH information of the second component carrier on the second component carrier. As for a length of the specific time period, a transmitter may determine the length of the specific time period based on information about the transmission mode of the receiver, the amount of data, and the like. The transmitter may provide to the receiver in advance the information about the specific time period and/or the information about the length of the specific time period. In other words, the information about the specific time period may be determined in advance between the transmitter and the receiver. In this third exemplary way, the transmitter does not need to waste the one bit (for example, the 'Carrier indicator' field 911 in FIG. 9) in the PDCCH information of the first component carrier, and does not need to use an arbitrary PDCCH format in a limited way to inform whether PDCCH information of the first component carrier includes PDCCH information of the second component carrier.

Figure 10:
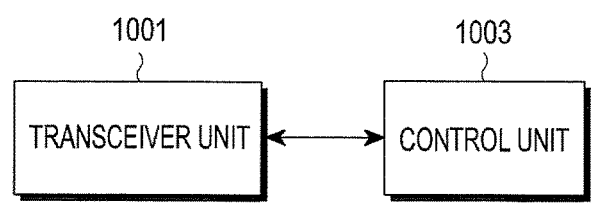
FIG. 10 illustrates a block diagram of a receiver for receiving control information in a wireless communication system according to an exemplary embodiment of the present disclosure.

FIG. 10 illustrates a block diagram of a receiver for receiving control information in a wireless communication system according to an exemplary embodiment of the present disclosure.

Referring to FIG. 10, the receiver includes a transceiver unit 1001 and a control unit 1003. The transceiver unit 1001 may be configured as a single unit, or may be configured as a transmitting unit and a receiving unit separate.

The transceiver unit 1001 receives a signal of a first component carrier and a signal of a second component carrier from a transmitter.

The control unit 1003 checks PDCCH information of a first component carrier, and determines whether PDCCH information of a second component carrier is carried on the second component carrier, based on the checked PDCCH information of the first component carrier. The control unit 1003 may use a blind decoding scheme when checking the PDCCH information of the first component carrier. If it is checked that the PDCCH information of the second component carrier is carried on the second component carrier, the control unit 1003 receives a signal of the second component carrier, and checks the PDCCH information of the second component carrier to acquire PDSCH information (for example, user data).

Specifically, for example, if it is checked from the PDCCH information of the first component carrier that a 'Carrier indicator' field included in the PDCCH information of the first component carrier is set to a value (for example, a binary value of '1') indicating the second component carrier, and an 'Additional control info flag' field is set to '0', then the control unit 1003 acquires PDCCH information of the second component carrier from the first component carrier, and receives a signal of the second component carrier by means of the transceiver unit 1001 to acquire PDSCH information of the second component carrier. On the contrary, if it is checked from the PDCCH information of the first component carrier that the 'Carrier indicator' field included in the PDCCH information of the first component carrier is set to a value (for example, a binary value of '1') indicating the second component carrier, and the 'Additional control info flag' field is set to '1', then the control unit 1003 receives a signal of the second component carrier by means of the transceiver unit 1001, and checks PDCCH information of the second component carrier to acquire PDSCH information. On the other hand, if it is checked from the PDCCH information of the first component carrier that the 'Carrier indicator' field included in the PDCCH information of the first component carrier is set to a value (for example, a binary value of '0') indicating the first component carrier, the control unit 1003 may acquire PDSCH information of the first component carrier.

As another example, if it is checked from the PDCCH information of the first component carrier that the PDCCH information of the first component carrier is configured in a specific PDCCH format for a specific transmission mode, the control unit 1003 unconditionally receives a signal of the second component carrier by means of the transceiver unit 1001 to check PDCCH information of the second component carrier, and then acquires PDSCH information.

As another example, if a signal of the first component carrier is received for a specific time period, the control unit 1003 unconditionally acquires PDCCH information of the first component carrier, and controls the transceiver unit 1001 to receive a signal of the second component carrier and check PDCCH information of the second component carrier.

Figure 11:
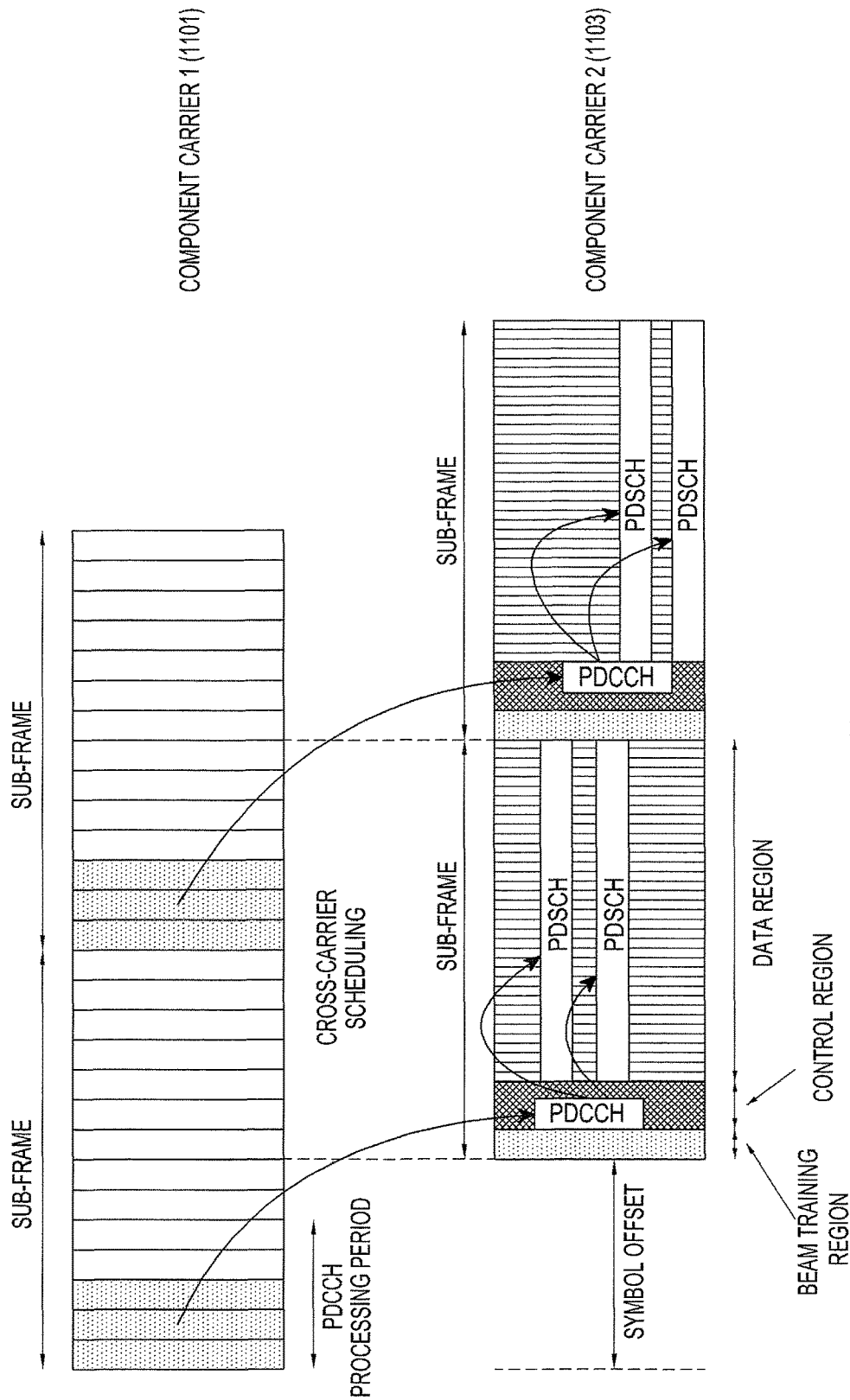
FIG. 11 illustrates an example of a flow of transmitting and receiving control information in a wireless communication system according to an exemplary embodiment of the present disclosure.
Figure 12:
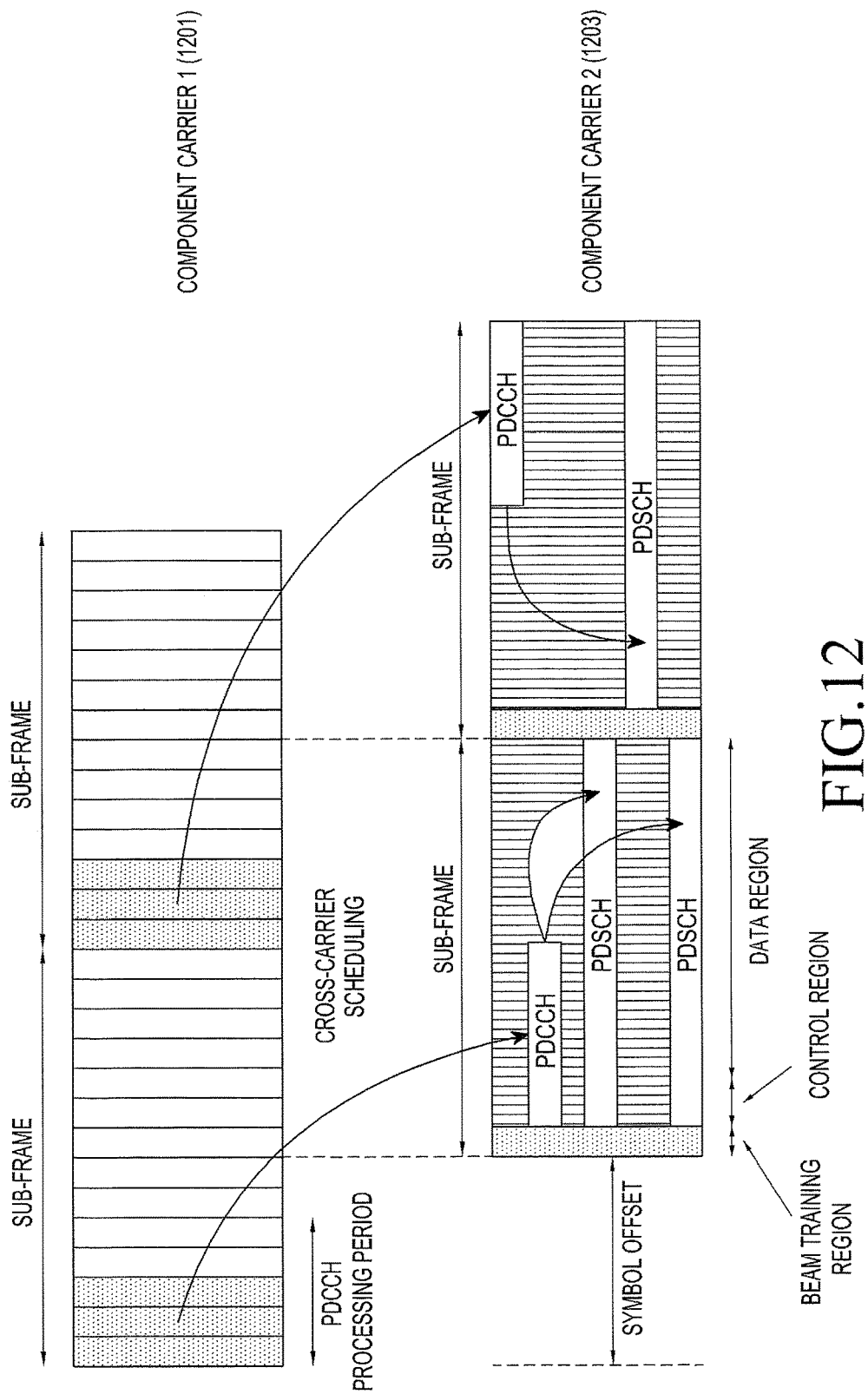
FIG. 12 illustrates another example of a flow of transmitting and receiving control information in a wireless communication system according to an exemplary embodiment of the present disclosure.
Figure 13:
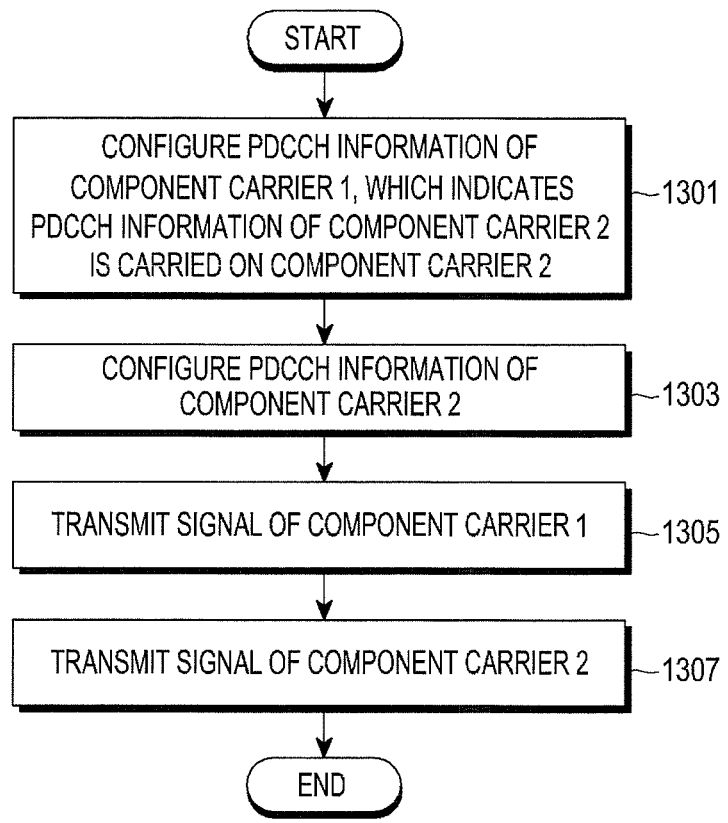
FIG. 13 illustrates a method of transmitting control information by a transmitter in a wireless communication system according to an exemplary embodiment of the present disclosure.

Reference will now be made to FIGS. 11 to 13 to describe examples in which when the transmitter performs cross-carrier scheduling, the receiver receives PDCCH information and PDSCH information of the second component carrier on the second component carrier.

FIG. 11 illustrates an example of a flow of transmitting and receiving control information in a wireless communication system according to an exemplary embodiment of the present disclosure. In this example, a control region and a data region exist in each sub-frame of a second component carrier 1103.

In the example of FIG. 11, as a symbol offset corresponding to seven OFDM symbols exists at a starting point of each sub-frame of the second component carrier 1103 and a starting point of each sub-frame of a first component carrier 1101, a receiver may receive the second component carrier 1103 only when PDCCH information and PDSCH information are allocated to the second component carrier 1103.

The receiver may use several different ways in receiving PDCCH information that is transmitted in a control region defined in a new type of sub-frame. For example, the receiver may use the blind decoding scheme that has been defined up to now in LTE-A. PDCCH information is allocated resources in units of Control-Channel Elements (CCEs), and one-PDCCH information may be transmitted over one or more CCEs. For convenience of description, a set of one or more CCEs will be referred to as a 'CCE set'. Candidate CCE sets that each receiver may use in receiving PDCCH information, are defined in advance, and they are called a 'search space'.

Referring to FIG. 11, the transmitter configures control information of the first component carrier 1101, which indicates that PDCCH information of the second component carrier 1103 is carried on the second component carrier 1103, and transmits a signal of the first component carrier 1101 including the configured control information of the first component carrier 1101, to the receiver.

The receiver receives the signal of the first component carrier 1101 form the transmitter, and checks PDCCH information of the first component carrier 1101. If it is checked that PDCCH information of the second component carrier 1103 is carried on the second component carrier 1103, the receiver receives a signal of the second component carrier 1103, and checks PDCCH information of the second component carrier 1103 to acquire PDSCH information.

If the receiver uses the above-described scheme of receiving PDCCH information of the second component carrier 1103, even in the new type of sub-frame structure, the receiver may directly receive the PDCCH information of the second component carrier 1103 without blind decoding, since the transmitter includes information about CCE sets in PDCCH information of the first component carrier 1101 when providing PDCCH information of the second component carrier 1103 using the PDCCH information of the first component carrier 1101.

FIG. 12 illustrates another example of a flow of transmitting and receiving control information in a wireless communication system according to an exemplary embodiment of the present disclosure. In this example, there is no control region in each sub-frame of a second component carrier 1203.

The example of FIG. 12 is the same as the example FIG. 11, in terms of operations of a transmitter and a receiver. However, since there is no control region in the sub-frames of the second component carrier 1203 as illustrated in FIG. 12, the receiver may check PDCCH information and PDSCH information in a data region in the sub-frames of the second component carrier 1203.

FIG. 13 illustrates a method of transmitting control information by a transmitter in a wireless communication system according to an exemplary embodiment of the present disclosure. Reference will be made to FIG. 13 to describe how a transmitter transmits a first component carrier and a second component carrier when the transmitter performs cross-carrier scheduling.

Referring to FIG. 13, the transmitter configures PDCCH information of a first component carrier, which indicates that PDCCH information of a second component carrier is carried on the second component carrier, in step 1301. In other words, in step 1301, the transmitter may configure PDCCH information of the first component carrier in accordance with one of the above-described three exemplary ways.

In step 1303, the transmitter configures PDCCH information of the second component carrier based on the configured PDCCH information of the first component carrier. In other words, in step 1303, the transmitter includes, in the PDCCH information of the second component carrier, the information which is not included in the configured PDCCH information of the first component carrier. The information, which is not included in the PDCCH information of the first component carrier, may vary depending on the three different exemplary ways described with reference to FIGS. 7, 8 and 9.

In step 1305, the transmitter transmits a signal of the first component carrier including the configured PDCCH information of the first component carrier. In step 1307, the transmitter transmits, to a receiver, a signal of the second component carrier including the configured PDCCH information of the second component carrier and PDSCH information. Although the transmission in step 1305 and the transmission in step 1307 have been described as separate operations for convenience of description, the transmitter may transmit together or separately the signal of the first component carrier transmitted in step 1305 and the signal of the second component carrier transmitted in step 1307.

Figure 14:
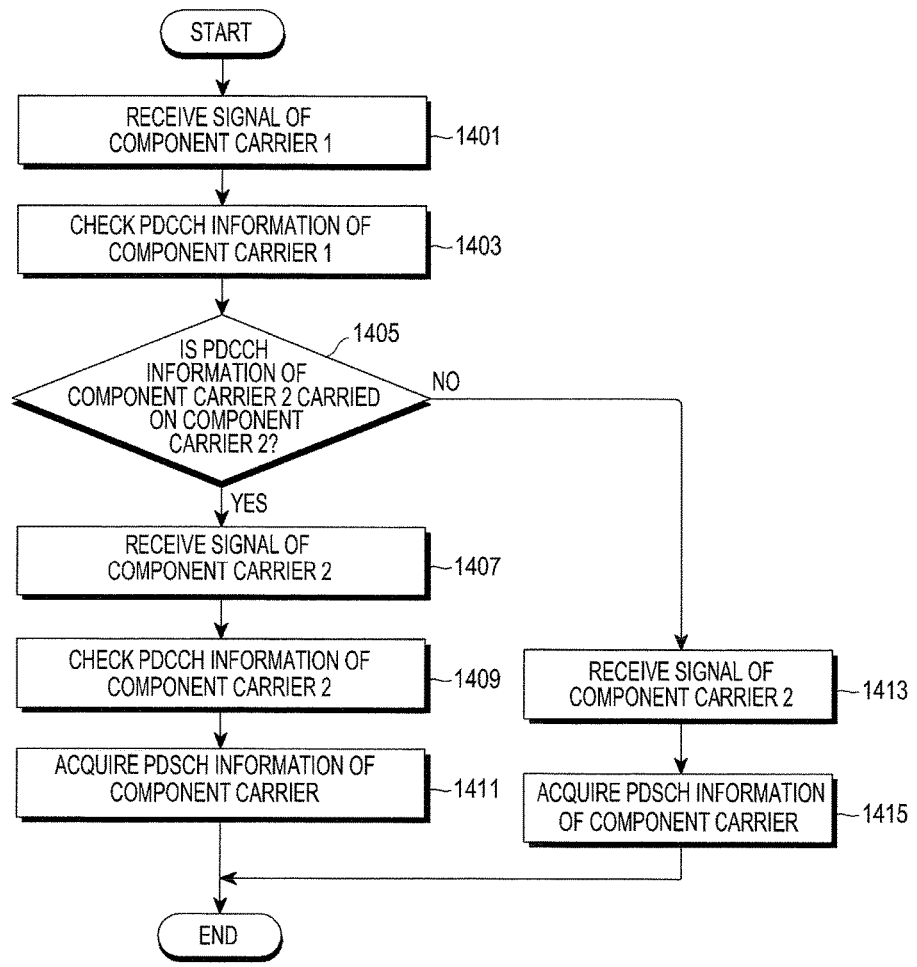
FIG. 14 illustrates a method of receiving control information by a receiver in a wireless communication system according to an exemplary embodiment of the present disclosure.

FIG. 14 illustrates a method of receiving control information by a receiver in a wireless communication system according to an exemplary embodiment of the present disclosure. Reference will be made to FIG. 14 to describe how a receiver receives a first component carrier and a second component carrier when a transmitter performs cross-carrier scheduling.

Referring to FIG. 14, the receiver receives a signal of a first component carrier from the transmitter in step 1401, and checks PDCCH information of the received first component carrier in step 1403.

Based on the checked PDCCH information of the first component carrier, the receiver determines in step 1405 whether PDCCH information of a second component carrier is carried on the second component carrier. In an alternative embodiment, the receiver may determine in step 1405 that the PDCCH information of the second component carrier is unconditionally carried on the second component carrier, depending the specific transmission mode for the above-described configuration of PDCCH information carried on the first component carrier, or depending on whether the PDCCH information of the first component carrier is transmitted for a specific time period.

If it is determined in step 1405 that the control information of the second component carrier is carried on the second component carrier, the receiver receives a signal of the second component carrier in step 1407, and checks PDCCH information of the received second component carrier in step 1409. In step 1411, the receiver acquires PDSCH information of the second component carrier depending on the checked PDCCH information of the second component carrier.

On the other hand, if it is determined in step 1405 that the control information of the second component carrier is not carried on the second component carrier, the receiver receives a signal of the second component carrier in step 1413, and acquires PDSCH information in step 1415 depending on the PDCCH information of the first component carrier, which is checked in step 1403.

As is apparent from the foregoing description, the present disclosure provides a method and apparatus for transmitting and receiving a large amount of control information when scheduling data carried on a broadband carrier signal in a high-frequency region using cross-carrier scheduling in a wireless communication system supporting Carrier Aggregation (CA).

In addition, the present disclosure provides a method and apparatus for increasing granularity of resource allocation or delivering additional control information when scheduling data carried on a broadband carrier signal in a high-frequency region using cross-carrier scheduling in a wireless communication system supporting CA.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for transmitting control information in a wireless communication system, the method comprising:
   determining an amount of control information to be included in a first carrier signal;
   transmitting the first carrier signal including first control information; and
   transmitting a second carrier signal including data, wherein the second carrier signal further includes second control information if a number of bits within the first carrier signal is not sufficient for the determined amount of control information;
   wherein the first control information includes information indicating whether the second control information is carried on the second carrier signal or not; and
   wherein the second control information includes scheduling information for the data if the second control information is included in the second carrier signal.

2. The method of claim 1, wherein the first control information includes at least one of a 'Carrier indicator' field indicating whether the second carrier signal is transmitted, and an 'Additional control info flag' field indicating whether the second control information is transmitted.

3. The method of claim 1, wherein the first control information includes at least one of a 'Carrier indicator' field indicating whether the second carrier signal is transmitted, and a 'location indication' field indicating a location where the second control information is allocated in the second carrier signal.

4. The method of claim 1, wherein the second carrier signal further includes a beam training region in which an optimal pair of a transmit beam of a transmitter and a receive beam of a receiver are searched.

5. An apparatus for transmitting control information in a wireless communication system, the apparatus comprising:
   a controller configured to determine an amount of control information to be included in a first carrier signal, to configure the first carrier signal including first control information, and to configure a second carrier signal including data, wherein the second carrier signal further includes second control information if a number of bits within the first carrier signal is not sufficient for the determined amount of control information; and
   a transceiver configured to transmit the first carrier signal and the second carrier signal;
   wherein the first control information includes information indicating whether the second control information is carried on the second carrier signal or not; and
   wherein the second control information includes scheduling information for the data if the second control information is included in the second carrier signal.

6. The apparatus of claim 5, wherein the first control information includes at least one of a 'Carrier indicator' field indicating whether the second carrier signal is transmitted or an 'Additional control info flag' field indicating whether the second control information is transmitted.

7. The apparatus of claim 5, wherein the first control information includes at least one of a 'Carrier indicator' field indicating whether the second carrier signal is transmitted or a 'location indication' field indicating a location of where the second control information is allocated in the second carrier signal.

8. The apparatus of claim 5, wherein the second carrier signal further includes a beam training region in which an optimal pair of a transmit beam of a transmitter and a receive beam of a receiver are searched.

* * * * *